United States Patent [19]
Fujino

[11] Patent Number: 5,111,088
[45] Date of Patent: May 5, 1992

[54] GUIDE RAIL MOUNTING STRUCTURE

[75] Inventor: Masahisa Fujino, Musashino, Japan

[73] Assignee: Canon Kabushiki Kaisha, Tokyo, Japan

[21] Appl. No.: 424,191

[22] Filed: Oct. 19, 1989

[30] Foreign Application Priority Data

Oct. 28, 1988 [JP] Japan .................................. 63-272286

[51] Int. Cl.⁵ .............................................. H02K 41/00
[52] U.S. Cl. ...................................... 310/12; 360/104; 369/219; 369/249
[58] Field of Search .................. 310/12, 42, 67 R, 91; 369/219, 223, 249, 215, 220; 360/104, 106, 109

[56] References Cited

U.S. PATENT DOCUMENTS

| | | | |
|---|---|---|---|
| 4,769,565 | 9/1988 | Teramachi | 310/12 |
| 4,908,816 | 3/1990 | Champagne et al. | 369/249 |
| 4,942,562 | 7/1990 | Suzuki | 369/249 |

FOREIGN PATENT DOCUMENTS 63-184967 7/1988 Japan .

Primary Examiner—Steven L. Stephan
Assistant Examiner—Judson H. Jones
Attorney, Agent, or Firm—Fitzpatrick, Cella, Harper & Scinto

[57] ABSTRACT

A guide rail mounting structure using a motor comprises a motor, a chassis to which the motor is fixed, and a guide rail positioned in contact with the stator portion of the motor.

19 Claims, 8 Drawing Sheets

GUIDE RAIL MOUNTING STRUCTURE

BACKGROUND OF THE INVENTION

1. Field of the Invention

This invention relates to a guide rail mounting structure for guiding and supporting, in an information recording and/or reproducing apparatus using a disk-like information recording medium such as an optical disk, a head carriage for effecting the recording and/or reproduction of information on the information recording medium.

2. Related Background Art

In an information recording-reproducing apparatus using an optical disk or the like, a head carriage carrying an optical head thereon is guided and supported by two guide rails and is adapted to be moved radially of the optical disk by driving means such as a linear motor.

Since the positional accuracy of an objective lens provided in the optical head has an influence upon the auto focusing and auto tracking of the optical head and the stability of signal reproduction, highly accurate positioning is required of the head carriage. In order to move this head carriage with good accuracy, the head carriage is designed such that in mounting it on the guide rails, the positioning thereof relative to the bearing of one of the guide rails is effected by fitting and the head carriage is mounted relative to the bearing of the other guide rail by the use of a slot, whereby the mounting dimension error between the guide rails is absorbed. Such an optical head driving device is disclosed in Japanese Laid-Open Patent Application No. 63-184967, etc.

Figures 1A, 1B:
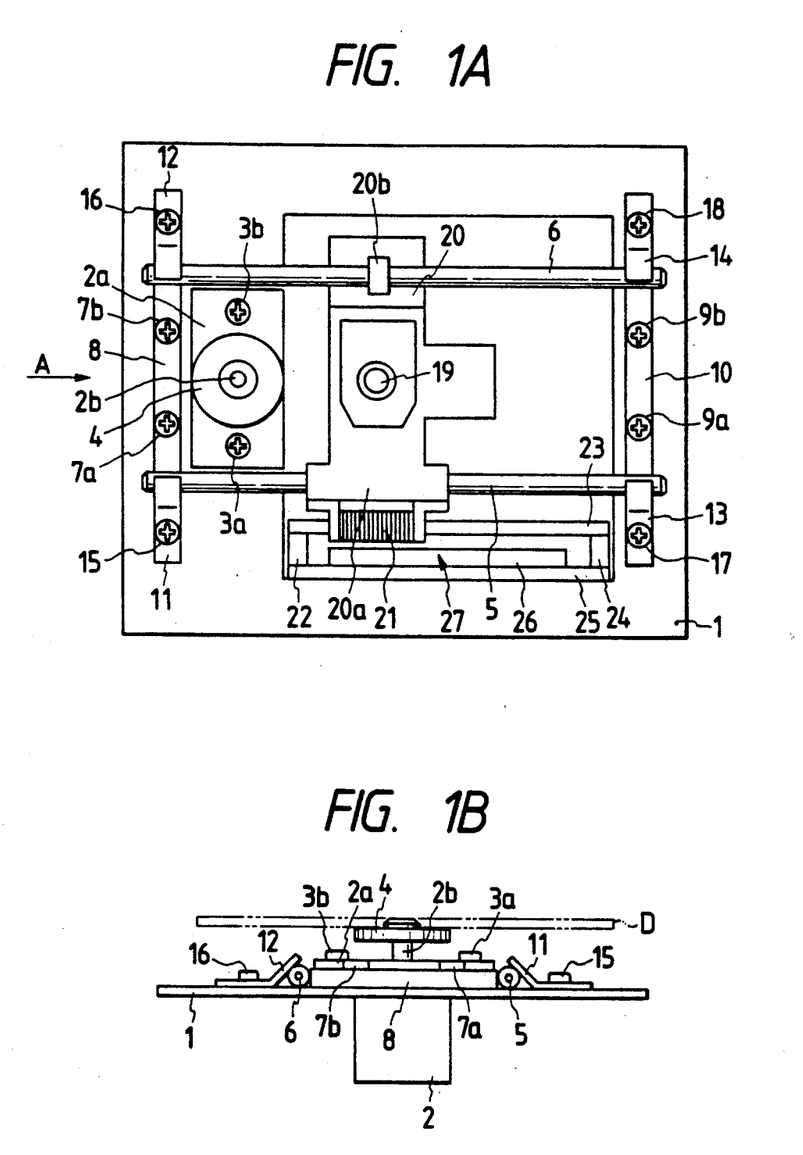
FIGS. 1A and 1B show a guide rail mounting structure for a prior-art optical head driving device.

FIG. 1A of the accompanying drawings is a view of the guide rail mounting structure for the prior-art optical head driving device as it is seen from the direction of the optic axis of an objective lens, and FIG. 1B of the accompanying drawings is a view of such structure as it is seen in the direction of arrow A in FIG. 1A which is a direction perpendicular to the optic axis of the objective lens.

In FIGS. 1A and 1B, a motor base portion 2a which is the stator portion of a spindle motor 2 is fixed to a chassis 1 which is the base of the optical head driving device by means of screws 3a and 3b, and a turn table 4 on which an optical disk D which is an information recording medium is placed is mounted on a rotary shaft 2b which is the rotor portion of the spindle motor 2. Two guide rails 5 and 6 are disposed parallel to each other at equidistant positions from the center of rotation of the turn table 4, and one end of each of these guide rails 5 and 6 is positioned by the opposite ends of a positioning member 8 fixed to the chassis 1 by means of screws 7a and 7b, and the other ends of the guide rails 5 and 6 are positioned by the opposite ends of a positioning member 10 fixed to the chassis 1 by means of screws 9a and 9b, and further the opposite ends of the guide rails 5 and 6 are fixed to the chassis 1 and the positioning members 8 and 10 by means of fixing fittings 11–14 and screws 15–18. A head carriage 20 carrying thereon an optical head including an objective lens 19 is supported on the guide rails 5 and 6, and as previously described, a bearing 20a on one side of the head carriage 20 is fitted and mounted on the guide rail 5 and a bearing 20b on the other side of the head carriage forms a slot-like shape and is slidable relative to the guide rail 6 so as to absorb the mounting dimension error between the guide rails 5 and 6. A coil 21 for driving the carriage is mounted on the side edge of the bearing 20a of the head carriage 20, and together with yokes 22–25 and a permanent magnet 26, it constitutes a linear motor 27.

The optical head is a device for converging a laser light from a laser such as a semiconductor laser and applying it to the information recording portion of an optical disk, and converting the reflected light therefrom into an electrical signal and effecting the recording and/or reproduction of information, and the essential portion thereof comprises an optical system and a driving system. The optical system is comprised of elements such as a semiconductor laser, an objective lens (a converging lens), a mirror, a prism and a light receiving diode. The driving system is a mechanism for moving the objective lens (the converging lens), or the optical system including the objective lens, or the mirror or the like following a surface vibration, a track vibration resulting from the rotation of the optical disk (focusing, tracking and the like), and always maintaining the relative positional relation between the optical disk and a converged spot constant, and the chief constituents thereof are a coil, a magnet, a support element and a slide unit. The head carriage 20 may carry the entire optical head thereon, or may assume such a construction that only a part constituting the optical head (the objective lens and the objective lens driving system) is carried on the head carriage 20 and the other part is disposed outside the head carriage 20.

As the optical disk D carried on the turn table 4 is rotated by the drive force of the spindle motor 2, the head carriage 20 is moved along the guide rails 5 and 6 by the drive force of the linear motor 27 and the recording and/or reproduction of information is effected on the optical disk D through the objective lens 19. Here, the positioning members 8 and 10 are used because predetermined mounting accuracy relative to the center of rotation of the spindle motor 2 must be ensured for the guide rails 5 and 6.

The following two are conceivable as the procedure of fixing the spindle motor 2 and the positioning members 8 and 10 to the chassis 1:

(1) To predetermine the fixing positions on the chassis 1, and mount each member thereat.

(2) To fix the spindle motor 2 to the chassis 1, and then newly measure the dimension from the center of rotation and mount the positioning members 8 and 10.

In the case mentioned under item (1) above, highly accurate working becomes necessary for each member and further, the dimensional tolerance of each member cumulates and therefore, highly accurate positioning is difficult, while in the case mentioned under item (2) above, there is the problem that much time is required of the work and mass production is difficult.

SUMMARY OF THE INVENTION

It is the object of the present invention to overcome the above-noted problems peculiar to the prior art and to provide a guide rail mounting structure which can easily accomplish highly accurate positioning.

To achieve the above object, the gist of the present invention resides in a guide rail mounting structure characterized in that guide rails for feeding a head carriage bear against the stator portion of a motor fixed to a chassis, whereby the guide rails are positioned.

DESCRIPTION OF THE PREFERRED EMBODIMENTS

The present invention will hereinafter be described with respect to some embodiments thereof shown in FIGS. 2 to 8.

Figure 2A:
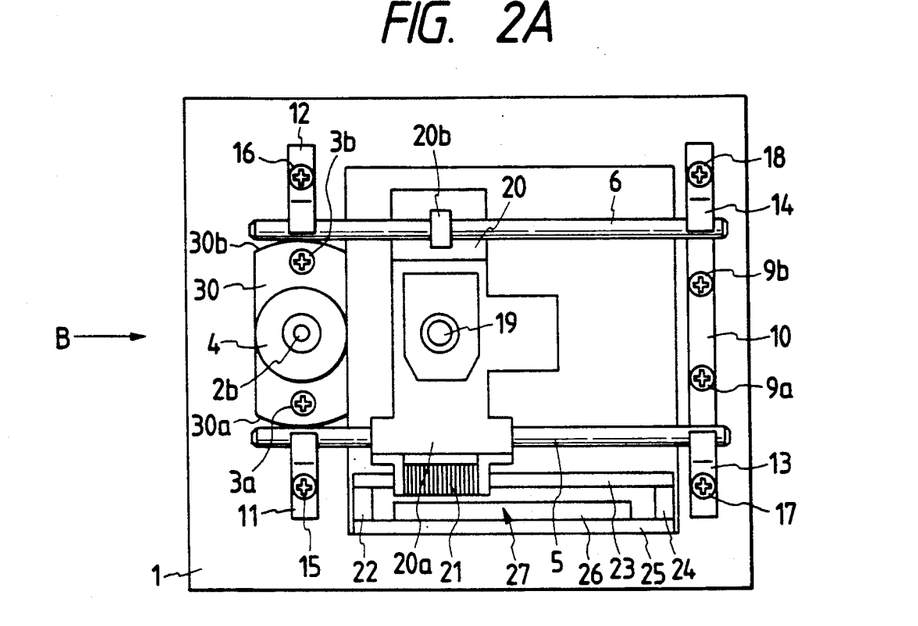
FIGS. 2A and 2B show a first embodiment of the guide rail mounting structure of the present invention.
Figure 2B:
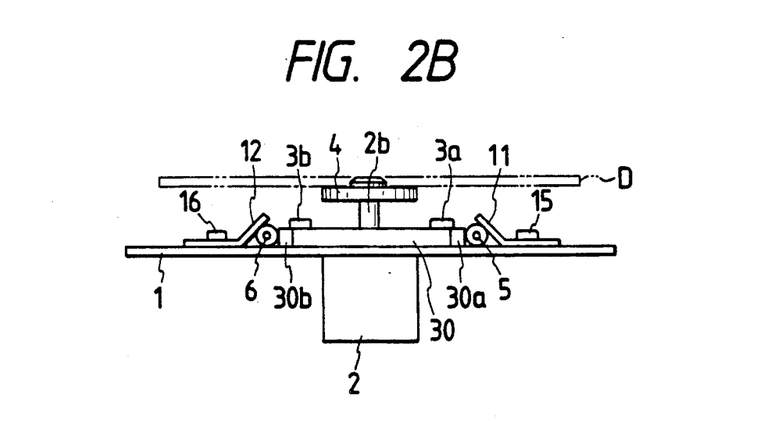

Referring to FIGS. 2A and 2B which show a first embodiment of the guide rail mounting structure for the optical head driving device of the present invention, FIG. 2A is a view of such structure as it is seen from the direction of the optic axis of an objective lens, and FIG. 2B is a view of such structure as it is seen in the direction of arrow B in FIG. 2A which is a direction perpendicular to the optic axis of the objective lens. In FIGS. 2A and 2B, members identical to those in FIGS. 1A and 1B are given common reference characters and need not be described.

In FIGS. 2A and 2B, a part of the outer peripheral end surface portion of a motor base portion 30 which is the stator portion of a spindle motor 2 is formed with arcuate sides 30a and 30b centered about the rotary shaft 2b of the motor, and a pair of guide rails 5 and 6 supporting a head carriage 20 carrying an optical head thereon are positioned in contact with the arcuate sides 30a and 30b, and are further fixed to a chassis 1 and the arcuate sides 30a and 30b by means of fixing fittings 11, 12 and screws 15, 16. The spindle motor 2 and the fixing fittings 11, 12 are fixed to the same chassis 1.

In the above-described construction, the arcuate sides 30a and 30b of the motor base portion 30 for positioning the guide rails 5 and 6 are concentric with the center of rotation of the rotary shaft 2b and therefore, even if the mounted position or direction of the motor base portion 30 deviates more or less, the spacing between the two parallel guide rails will not change and thus, if an objective lens 19 is at the center of the head carriage 20, that is, if the optic axis of the objective lens is at the center of the two guide rails, the optic axis of the objective lens 19 will move without fail on an imaginary straight line passing through the center of rotation of the motor. Also, the arcuate sides 30a and 30b can be machined integrally with the motor base portion 30 with accuracy of several tens of $\mu$m or less by a lathe, and highly accurate positioning can be carried out.

The guide rails 5 and 6 are disposed parallel to each other at equidistant positions from the rotary shaft 2b of the motor, and one end portion of each of these two guide rails 5 and 6 is positioned in contact with the outer peripheral end surface portion of the motor base portion 30 fixed to the chassis 1 by means of screws 3a and 3b, and the other end portions of the guide rails 5 and 6 are positioned by the opposite ends of a positioning member 10 fixed to the chassis 1 by means of screws 9a and 9b.

Further the opposite ends of the guide rails 5 and 6 are fixed to the chassis 1, the outer peripheral end portions of the motor base 30 and the positioning member 10 by means of fixing fittings 11-14 and screws 15-18.

When the guide rails supporting the head carriage are to be thus positioned and fixed by the use of the motor, the motor is first fixed to the chassis, and then the guide rails are brought into contact with and positioned relative to the stator portion of the motor, and finally the thus positioned guide rails are fixed by means of a fixing member.

In the embodiment shown in FIGS. 2A and 2B, the arcuate sides 30a and 30b of the outer peripheral end surface portions of the motor base portion 30 are of arcuate shapes of the same radius concentric with the center of the rotary shaft 2b. This is because machining is easiest and consequently highly accurate positioning becomes possible.

Figure 3A:
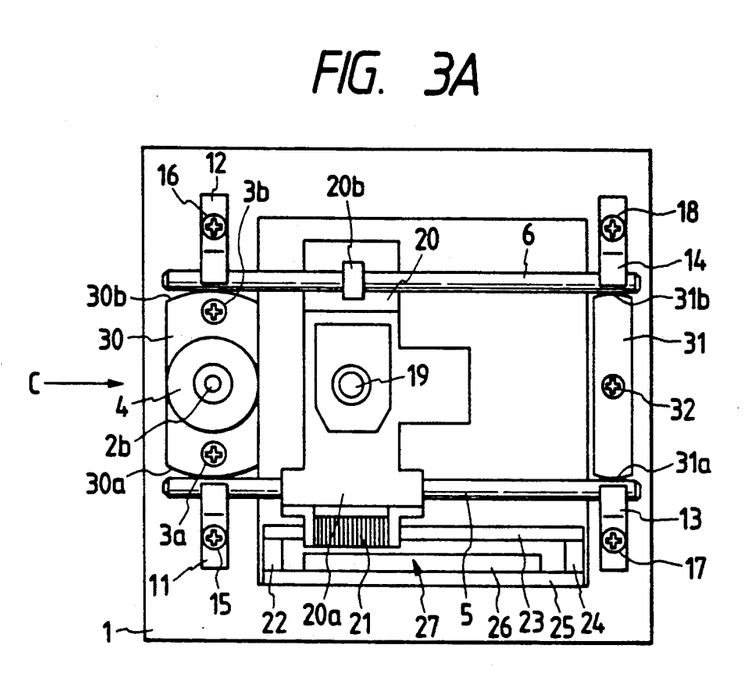
FIGS. 3A and 3B show a second embodiment of the guide rail mounting structure of the present invention.
Figure 3B:
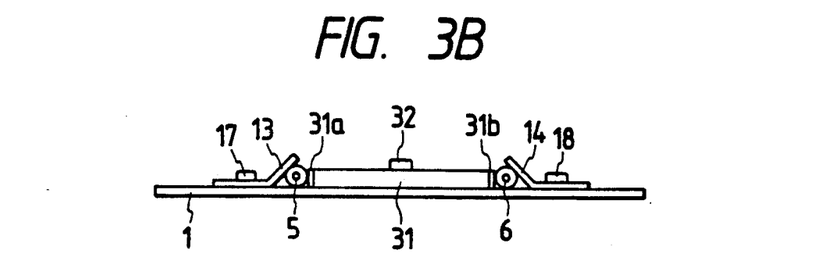

Referring now to FIGS. 3A and 3B which show a second embodiment of the guide rail mounting structure for the optical head driving device of the present invention, FIG. 3A is a view of such structure as it is seen from the direction of the optic axis of the objective lens, and FIG. 3B is a view of such structure as it is seen in the direction of arrow C in FIG. 3A which is a direction perpendicular to the optic axis of the objective lens. In FIGS. 3A and 3B, members identical to those in FIGS. 2A and 2B are given common reference characters and need not be described.

In FIGS. 3A and 3B, a positioning member 31 for positioning the end portions of the guide rails 5 and 6 which are opposite to the motor base portion 30 has its end surfaces against which the guide rails 5 and 6 bear made into arcuate sides 31a and 31b of the same radius as the arcuate sides 30a and 30b. The center of the positioning member 31 which corresponds to the rotary shaft 2b of the spindle motor 2 is fixed to the chassis 1 by means of a screw 32. The screw 32 is equidistant from the two guide rails 5 and 6.

In this second embodiment, even if the mounted position or direction of not only the motor base portion 30 but also the positioning member 31 deviates more or less, the spacing between the two parallel guide rails will not change and therefore, if the objective lens 19 is at the center of the head carriage. That is, if the optic axis of the objective lens is at the center of the two guide rails, the optic axis of the objective lens 19 will move without fail on an imaginary straight line passing through the center of rotation of the rotary shaft 2b of the motor and also, it becomes possible to maintain the spacing between the guide rails 5 and 6 constant with high accuracy and thus, it is not necessary to make the bearing 20b of the head carriage 20 into a slot-like shape as in the prior art and the ordinary hole machining can be adopted.

In the embodiment shown in FIGS. 3A and 3B, the line passing through the center of the screw 32 and the center of the rotary shaft 2b of the motor intersects the optic axis of the objective lens 19 and is parallel to the guide rails 5 and 6.

Figure 4A:
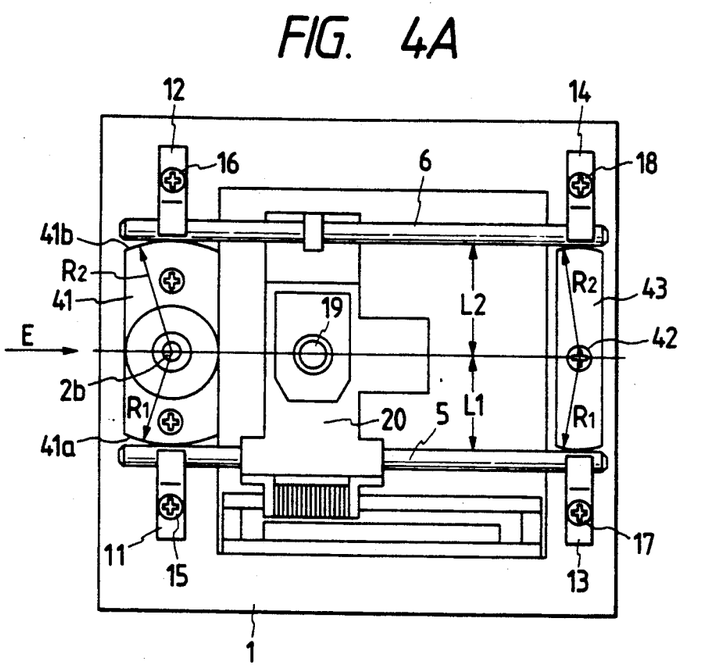
FIGS. 4A and 4B show a third embodiment of the guide rail mounting structure of the present invention.
Figure 4B:
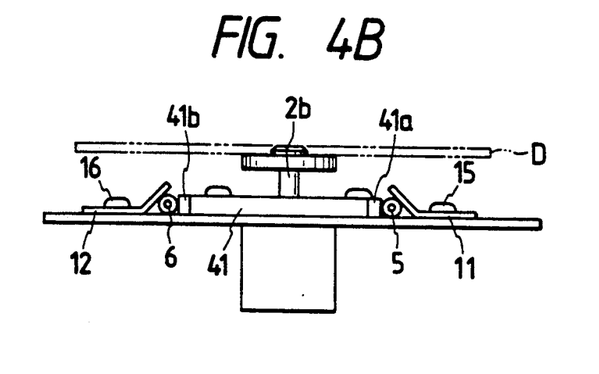

Referring to FIGS. 4A and 4B which show a third embodiment of the guide rail mounting structure for the optical head driving device of the present invention, FIG. 4A is a view of such structure as it is seen from the direction of the optic axis of the objective lens, and FIG. 4B is a view of such structure as it is seen in the direction of arrow E in FIG. 4A which is a direction perpendicular to the optic axis of the objective lens. In FIGS. 4A and 4B, members identical to those in FIGS. 3A and 3B are given common reference characters and need not be described.

In the third embodiment shown in FIGS. 4A and 4B, the outer peripheral end surface portions of the motor base portion 41 of the spindle motor 2 are formed with arcuate sides 41a and 41b centered about the rotary shaft 2b and having different radii R1 and R2, and the guide rails 5 and 6 are brought into contact with the arcuate sides 41a and 41b, respectively, and are fixed to the chassis 1 and the arcuate sides 41a and 41b by means of fixing fittings 11, 12 and screws 15, 16.

In the above-described construction, the arcuate sides 41a and 41b of the motor base portion 41 for positioning the guide rails 5 and 6 are concentric with the center of rotation of the rotary shaft 2b and therefore, even if the mounted position or direction of the motor base portion 41 deviates, the spacing between the two guide rails will not change and thus, highly accurate positioning can be accomplished easily. Also, the arcuate sides 41a and 41b are formed with different radii and therefore, the distances L1 and L2 from the optic axis of the objective lens 19 to the guide rails 5 and 6 can be set freely, and the degree of freedom of the design of the head carriage 20 can be improved.

Also, in the embodiment shown in FIGS. 4A and 4B, a positioning member 43 for positioning the end portions of the guide rails 5 and 6 which are opposite to the motor base portion 41 has its end surface which is in contact with the guide rails 5 and 6 formed into an arcuate side of the same radius as the arcuate sides 41a and 41b. The location on the positioning member 43 which corresponds to the rotary shaft 2b of the spindle motor 2 is fixed to the chassis 1 by means of a screw 42.

Figure 5A:
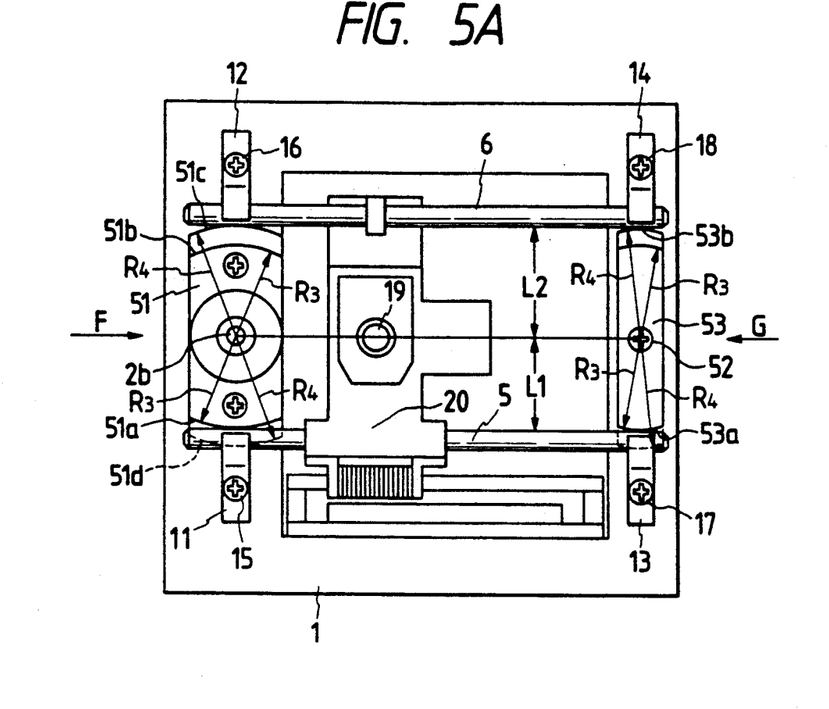
FIGS. 5A, 5B and 5C show a fourth embodiment of the guide rail mounting structure of the present invention.
Figure 5B:
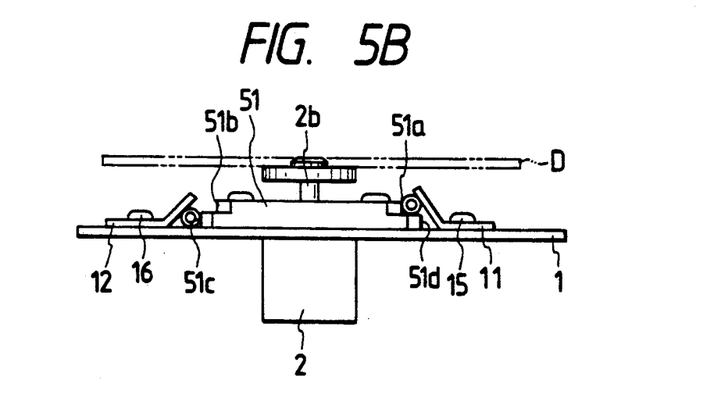
Figure 5C:
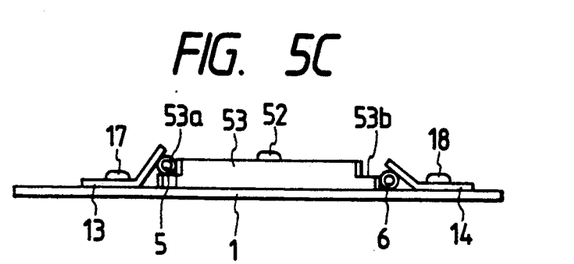

Referring to FIGS. 5A, 5B and 5C which show a fourth embodiment of the guide rail mounting structure for the optical head driving device of the present invention, FIG. 5A is a view of such structure as it is seen from the direction of the optic axis of the objective lens, FIG. 5B is a view of such structure as it is seen in the direction of arrow F in FIG. 5A which is a direction perpendicular to the optic axis of the objective lens, and FIG. 5C is a view of such structure as it is seen in the direction of arrow G in FIG. 5A which is a direction perpendicular to the optic axis of the objective lens. In FIGS. 5A, 5B and 5C, members identical to those in FIGS. 4A and 4B are given common reference characters and need not be described.

In the fourth embodiment shown in FIGS. 5A, 5B and 5C, the outer peripheral end portions of the motor base portion 51 of the spindle motor 2 are formed with arcuate stepped portions 51a, 51b, 51c and 51d centered about the rotary shaft 2b and having different radii R3 and R4, and the guide rails 5 and 6 are brought into contact with the arcuate stepped portions 51a and 51c, respectively, and are fixed by means of fixing fittings 11, 12 and screws 15, 16. The other end portions of the guide rails 5 and 6 are positioned by a positioning member 53 having stepped portions 53a and 53b corresponding to the arcuate stepped portions of the motor base portion 51, and are fixed by means of fixing fittings 13, 14 and screws 17, 18.

In the above-described construction, the arcuate stepped portions 51a and 51c of the motor base portion 51 for positioning the guide rails 5 and 6 are concentric with the center of rotation of the rotary shaft 2b and therefore, even if the mounted position or direction of the motor base portion 52 deviates, the spacing between the two guide rails will not change and thus, highly accurate positioning can be accomplished easily. Also, the arcuate stepped portions 51a and 51c are formed with different radii and different heights and therefore, the distances L1 and L2 from the optic axis to the guide rails 5 and 6 and the heights can be freely set and the degree of freedom of the design of the head carriage 20 can be improved.

Figure 6A:
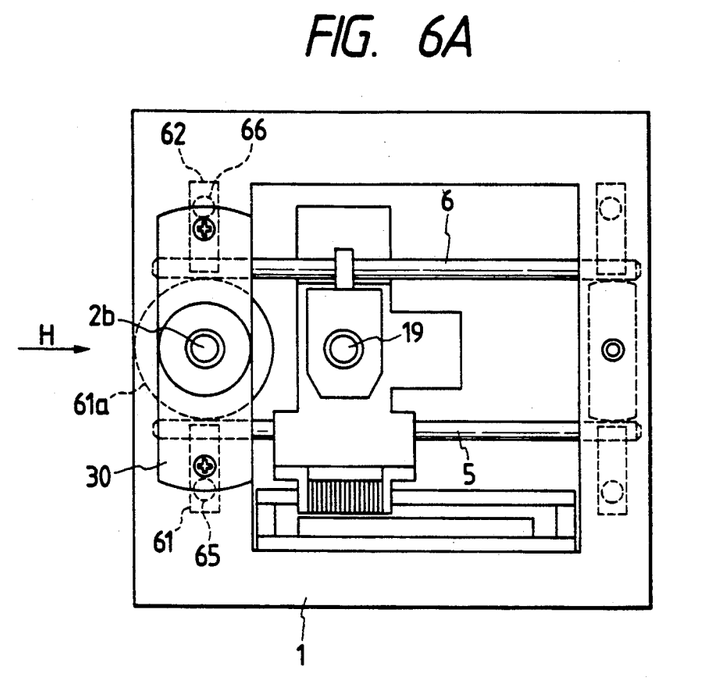
FIGS. 6A and 6B show a fifth embodiment of the guide rail mounting structure of the present invention.
Figure 6B:
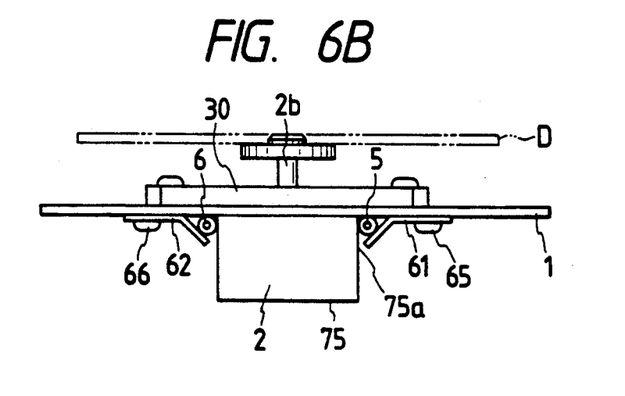

Referring to FIGS. 6A and 6B which show a fifth embodiment of the guide rail mounting structure for the optical head driving device of the present invention, FIG. 6A is a view of such structure as it is seen from the direction of the optic axis of the objective lens, and FIG. 6B is a view of such structure as it is seen in the direction of arrow H in FIG. 6A which is a direction perpendicular to the optic axis of the objective lens. In FIGS. 6A and 6B, members identical to those in FIGS. 2A and 2B are given common reference characters and need not be described.

In the fifth embodiment shown in FIGS. 6A and 6B, the outer peripheral portion of a motor cover 75 covering the driving portion of the spindle motor 2 which is the stator portion of the motor is formed with a cylindrical surface 75a centered about the rotary shaft 2b, and the guide rails 5 and 6 are brought into contact with the cylindrical surface 75a and are fixed to the chassis 1 and the motor cover 75 by means of fixing fittings 61, 62 and screws 65, 66.

In the above-described construction, the cylindrical surface 75a of the motor cover 75 for positioning the guide rails 5 and 6 is concentric with the center of rotation of the rotary shaft 2b and therefore, even if the mounted position or direction of the motor base portion 30 deviates, the spacing between the two guide rails will not change and therefore, highly accurate positioning can be accomplished easily.

Figure 7A:
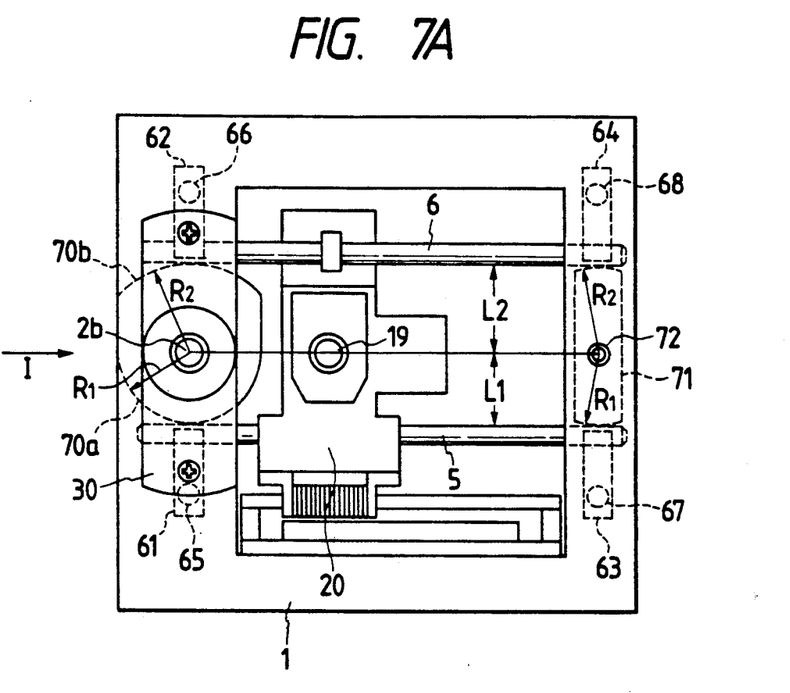
FIGS. 7A and 7B show a sixth embodiment of the guide rail mounting structure of the present invention.
Figure 7B:
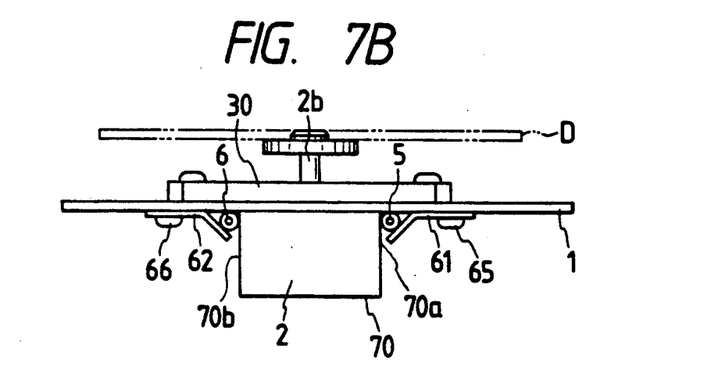

Referring to FIGS. 7A and 7B which show a sixth embodiment of the guide rail mounting structure for the optical head driving device of the present invention, FIG. 7A is a view of such structure as it is seen from the direction of the optic axis of the objective lens, and FIG. 7B is a view of such structure as it is seen in the direction of arrow I in FIG. 7A which is a direction perpendicular to the optic axis of the objective lens; In FIGS. 7A and 7B, members identical to those in FIGS. 4A and 4B are given common reference characters and need not be described.

In the sixth embodiment shown in FIGS. 7A and 7B, the outer peripheral portion of a motor cover 70 covering the driving portion of the spindle motor 2 is formed with cylindrical surfaces 70a and 70b centered about the rotary shaft 2b and having different radii R1 and R2, and the guide rails 5 and 6 are brought into contact with the cylindrical surfaces 70a and 70b and are fixed to the chassis 1 and the cylindrical surfaces 70a and 70b by means of fixing fittings 61, 62 and screws 65, 66.

In the above-described construction, the cylindrical surfaces 70a and 70b of the outer peripheral portion of the motor cover 70 for positioning the guide rails 5 and 6 are concentric with the center of rotation of the rotary shaft 2b and therefore, even if the mounted position or direction of the motor base portion 30 deviates, the spacing between the two guide rails will not change and therefore, positioning can be accomplished easily.

Also, the cylindrical surfaces 70a and 70b are formed with different radii and therefore, the distances L1 and L2 from the optic axis to the guide rails 5 and 6 can be freely set, and the degree of freedom of the design of the head carriage 20 can be improved.

Also, the other ends of the guide rails 5 and 6 are positioned by a positioning member 71 having the same arcuate shape as the cylindrical surfaces of the outer peripheral portion of the motor cover 70, and are fixed to the chassis 1 and the positioning member 71 by means of fixing fittings 63, 64 and screws 67, 68. The reference numeral 72 designates a screw for fixing the positioning member 71 to the chassis 1.

Figure 8A:
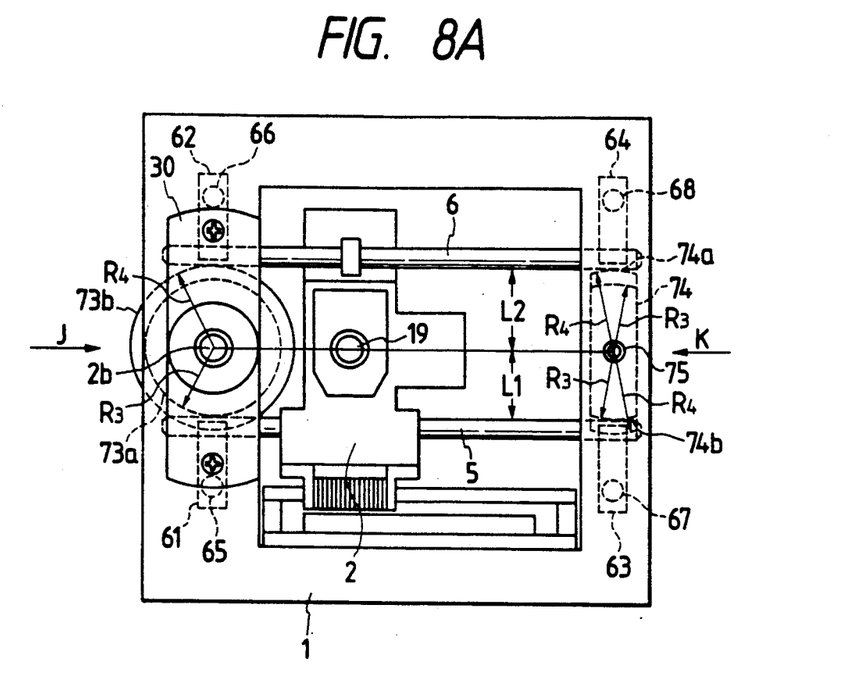
FIGS. 8A, 8B and 8C show a seventh embodiment of the guide rail mounting of the present invention.
Figure 8B:
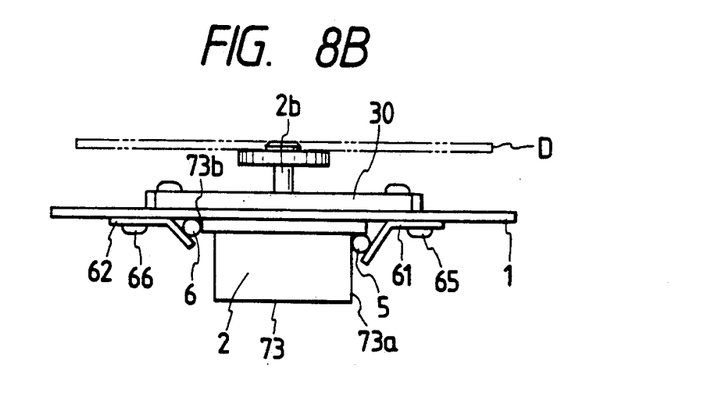
Figure 8C:
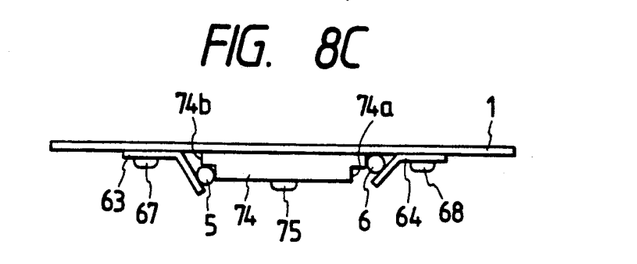

Referring o FIGS. 8A, 8B and 8C which show a seventh embodiment of the guide rail mounting structure for the optical head driving device of the present invention, FIG. 8A is a view of such structure as it is seen from the direction of the optic axis of the objective lens, FIG. 8B is a view of such structure as it is seen in the direction of arrow J in FIG. 8A which is a direction perpendicular to the optic axis of the objective lens, and FIG. 8C is a view of such structure as it is seen in the direction of arrow K in FIG. 8A which is a direction perpendicular to the optic axis of the objective lens. In FIGS. 8A, 8B and 8C, members identical to those in FIGS. 7A and 7B are given common reference characters and need not be described.

In the seventh embodiment shown in FIGS. 8A, 8B and 8C, the outer peripheral portion of a motor cover 73 covering the driving portion of the spindle motor 2 is formed with two-stepped cylindrical portions 73a and 73b centered about the rotary shaft 2b and having different radii R3 and R4, and the guide rails 5 and 6 are brought into contact with the two-stepped cylindrical portions 73a and 73b, respectively, and are fixed to the chassis 1 and the cylindrical portions by means of fixing fittings 61, 62 and screws 65, 66. The other end portions of the guide rails 5 and 6 are positioned by a positioning member 74 having stepped portions 74a and 74b corresponding to the two-stepped cylindrical portions of the motor cover 73, and are fixed to the chassis 1 and the positioning member 74 by means of fixing fittings 63, 64 and screws 67, 68.

In the above-described construction, the two-stepped cylindrical portions 73a and 73b of the outer peripheral portion of the motor cover 73 for positioning the guide rails 5 and 6 are concentric with the center of rotation of the rotary shaft 2b and therefore, even if the mounted position or direction of the motor base portion 30 deviates, the spacing between the two guide rails will not change and thus, highly accurate positioning can be accomplished easily. Also, the two-stepped cylindrical portions 73a and 73b are formed with different radii and different heights and therefore, the distances L1 and L2 from the optic axis to the guide rails 5 and 6 can be freely set and the degree of freedom of the design of the head carriage 20 can be improved.

As described above, the guide rail mounting structure according to the present invention uses the stator portion of the spindle motor for the positioning of the guide rails, whereby it can realize highly accurate positioning in the mounting of the guide rails, and this leads to the advantage that the working property is improved.

I claim:

1. A guide rail mounting structure using a motor, comprising:
   a motor having a stator portion;
   a chassis to which said motor is fixed; and
   a guide rail positioned in contact with said stator portion of said motor, wherein
   said stator portion of said motor is an outer peripheral surface of a motor base portion for fixing said motor to said chassis.

2. A guide rail mounting structure according to claim 1, wherein said outer peripheral surface of said motor base portion is of an arcuate shape.

3. A guide rail mounting structure according to claim 1, further comprising a first fixing member for bringing said guide rail into contact with said stator portion of said motor and fixing said guide rail.

4. A guide rail mounting structure using a motor, comprising:
   a motor having a stator portion;
   a chassis to which said motor is fixed;
   a guide rail positioned in contact with said stator portion of said motor; and
   a first fixing member for bringing said guide rail into contact with said stator portion of said guide rail into contact with said stator portion of said motor and fixing said guide rail, wherein
   said motor and said first fixing member are fixed to the same chassis.

5. A guide rail mounting structure according to claim 1, further comprising a first fixing member for bringing one end portion of said guide rail into contact with said stator portion of said motor and fixing the same.

6. A guide rail mounting structure according to claim 5, further comprising a second fixing member for fixing the other end portion of said guide rail.

7. A guide rail mounting structure according to claim 1, wherein said guide rail is provided in pairs.

8. A guide rail mounting structure using a motor, comprising:
   a motor having a stator portion;
   a chassis to which said motor is fixed; and
   a guide rail positioned in contact with said stator portion of said motor, wherein
   said stator portion of said motor is an outer peripheral surface of a motor cover portion covering a driving portion of said motor.

9. A guide rail mounting structure according to claim 8, wherein an outer peripheral surface of said motor cover portion is of an arcuate shape.

10. An information recording-reproducing apparatus comprising:
    a head unit for effecting the recording and/or reproduction of information on an information recording medium;
    moving means for moving said head unit in a predetermined direction;
    rotating means for rotating said information recording medium, said rotating means comprising a rotor portion and a stator portion;
    a chassis to which said rotating means is fixed; and
    guide means for guiding said head unit in said predetermined direction, said guide means being positioned in contact with said stator portion of said rotating means.

11. An information recording-reproducing apparatus according to claim 10, wherein the information recording medium is an optical information recording medium and said head unit includes an objective lens for irradiating a light beam for effecting the recording and/or reproduction of information on the information recording medium and a driving device for driving said objective lens.

12. An information recording-reproducing apparatus according to claim 10, wherein said stator portion of said rotating means is a motor base portion for fixing said rotating means to said chassis, and said guide means is positioned in contact with an outer peripheral surface of said motor base portion.

13. An information recording-reproducing apparatus according to claim 12, wherein said outer peripheral surface of said motor base portion is of an arcuate shape.

14. An information recording-reproducing apparatus according to claim 13, wherein one end portion of said guide means is positioned in contact with said stator portion, and another end portion of said guide means is positioned in contact with an outer peripheral surface of a positioning member fixed to said chassis,
wherein said outer peripheral surface of said positioning member is of substantially the same arcuate shape as said motor base portion.

15. An information recording-reproducing apparatus according to claim 10, wherein said guide means has two guide rails, and each said guide rail is positioned in contact with said stator portion of said rotating means.

16. An information recording-reproducing apparatus according to claim 15, wherein said two guide rails are positioned in parallel with each other.

17. An information recording-reproduction apparatus according to claim 16, wherein said two guide rails are positioned, respectively, in parallel with a recording surface of the information recording medium being rotated by said rotating means.

18. An information recording-reproducing apparatus according to claim 10, wherein said stator portion includes a motor cover for covering a driving portion of said rotating means, and said guide means is positioned in contact with an outer peripheral surface of said motor cover.

19. An information recording-reproducing apparatus according to claim 18, wherein an outer peripheral surface of said motor cover portion is an arcuate shape.

* * * * *

UNITED STATES PATENT AND TRADEMARK OFFICE
CERTIFICATE OF CORRECTION

PATENT NO. : 5,111,088
DATED : May 5, 1992
INVENTOR(S) : Masahisa Fujino

It is certified that error appears in the above-identified patent and that said Letters Patent is hereby corrected as shown below:

COLUMN 8:

Line 18, "guide rail" should be deleted.
Line 19, "into contact with said stator portion of said" should be deleted.

COLUMN 10:

Line 6, "recording-reproduction" should read --recording-reproducing--.

Signed and Sealed this

Tenth Day of August, 1993

Attest:

MICHAEL K. KIRK

Attesting Officer

Acting Commissioner of Patents and Trademarks